(12) United States Patent
Mascaretti et al.

(10) Patent No.: US 11,464,328 B2
(45) Date of Patent: Oct. 11, 2022

(54) SERVICE CART

(71) Applicants: Juan Pablo Mascaretti, West Lafayette, IN (US); Valentin Ramirez, Neuquén (AR)

(72) Inventors: Juan Pablo Mascaretti, West Lafayette, IN (US); Valentin Ramirez, Neuquén (AR)

( * ) Notice: Subject to any disclaimer, the term of this patent is extended or adjusted under 35 U.S.C. 154(b) by 0 days.

(21) Appl. No.: 17/076,517

(22) Filed: Oct. 21, 2020

(65) Prior Publication Data
US 2021/0259406 A1    Aug. 26, 2021

Related U.S. Application Data

(60) Provisional application No. 62/979,156, filed on Feb. 20, 2020.

(51) Int. Cl.
*A47B 31/06*   (2006.01)
*B62B 3/00*    (2006.01)
*E05C 1/04*    (2006.01)
*A47B 31/00*   (2006.01)

(52) U.S. Cl.
CPC .............. *A47B 31/06* (2013.01); *B62B 3/004* (2013.01); *E05C 1/04* (2013.01); *A47B 2031/002* (2013.01); *B62B 2202/67* (2013.01)

(58) Field of Classification Search
CPC ......... A47B 31/06; A47B 31/00; A47B 31/02; A47B 2031/002; A47B 2031/003; B62B 3/004; B62B 2202/67
See application file for complete search history.

(56) References Cited

U.S. PATENT DOCUMENTS

| | | | |
|---|---|---|---|
| 4,898,294 A * | 2/1990 | Jennings | A47J 41/0044 220/592.09 |
| 5,363,978 A * | 11/1994 | Molo | A47J 36/027 220/254.3 |
| 5,762,228 A * | 6/1998 | Morgan | B65D 47/0895 220/367.1 |
| 6,139,034 A | 10/2000 | Williams | |
| 7,544,915 B2 | 6/2009 | Hu | |
| 8,690,170 B2 | 4/2014 | Bélanger et al. | |
| 8,936,260 B2 | 1/2015 | Burd | |
| 9,193,462 B2 | 11/2015 | Burd | |
| 9,889,935 B2 * | 2/2018 | Burd | A47B 31/06 |

(Continued)

FOREIGN PATENT DOCUMENTS

CN   104116321 A  * 10/2014  ............ B64D 11/04
CN   106667044 A  *  5/2017
(Continued)

*Primary Examiner* — Steve Clemmons
(74) *Attorney, Agent, or Firm* — Indiana University Maurer School of Law Intellectual Property Legal Clinic

(57) ABSTRACT

The present disclosure generally relates to a service cart. The service cart includes an outer shell, an inner shell, a door, a rubber latch, a handlebar, and a braking system. The inner shell is surrounded by the outer shell with rounded edges and a recessed area. The door is coupled to the outer shell. The rubber latch is connected to the door and capable of magnetically coupling with the recessed area on the outer shell. The handlebar is disposed on top of the outer shell. The braking system is controlled by a twist lock on the handlebar to activate a plurality of brakes on wheels.

16 Claims, 27 Drawing Sheets

(56) References Cited

U.S. PATENT DOCUMENTS

| | | | | |
|---|---|---|---|---|
| 9,986,823 | B2 * | 6/2018 | Winter | G07C 11/00 |
| 10,130,171 | B2 * | 11/2018 | Olson | A47B 31/00 |
| 10,137,987 | B2 * | 11/2018 | Burd | B62B 5/0447 |

FOREIGN PATENT DOCUMENTS

| | | | | |
|---|---|---|---|---|
| CN | 108851566 A | * | 11/2018 | |
| CN | 111713897 A | * | 9/2020 | |
| DE | 102008060665 B3 | * | 4/2010 | A47B 31/00 |
| EP | 3825231 A1 | * | 5/2021 | B62B 3/02 |
| FR | 2561509 A1 | * | 9/1985 | B32B 7/14 |
| FR | 2654057 A1 | * | 5/1991 | A47B 55/00 |
| WO | WO-0021410 A1 | * | 4/2000 | B60B 33/0057 |
| WO | WO-2006048586 A1 | * | 5/2006 | A47B 31/00 |
| WO | WO-2015150829 A1 | * | 10/2015 | B62B 3/003 |

* cited by examiner

SERVICE CART

CROSS-REFERENCE TO RELATED APPLICATIONS

The present application claims the benefit of U.S. Provisional Patent Application Ser. No. 62/979,156, filed Feb. 20, 2020, to Juan Pablo Mascaretti et al., and entitled "SERVICE CART," the complete disclosure of which is expressly incorporated by reference herein.

FIELD OF DISCLOSURE

The present disclosure relates to food and beverage distribution systems and, more particularly, to food and beverage carts and systems for use on an airplane.

BACKGROUND OF THE DISCLOSURE

Various food and beverage carts may be used on public transportation to enhance the customer experience. For example, food and beverage carts may be used on busses, airplanes, trains, or any other mode of public transportation, or may be used to carry and distribute food in various venues, such as hotels, arenas, stadiums, convention centers, etc. Depending on the configuration of the cart and the space in which it is being used, there may not be much room to access the food and beverages within the cart or allow customers to easily walk around the cart. For example, on an airplane, prior art food and beverage carts often have a width similar to that of the airplane aisle, making it difficult or impossible for passengers on the airplane to walk around the cart while in the aisle and making it difficult for flight attendants to access some of the compartments of the cart. Therefore, there is a need for a food and beverage cart which allows for maneuverability around the cart and easy access to compartment and items of the cart.

SUMMARY OF THE DISCLOSURE

According to the present disclosure, a service cart comprises an outer shell with rounded edges and a recessed part, an inner shell surrounded by the outer shell, a door coupled to the outer shell, a rubber latch connected to the door and capable of magnetically coupling with the recessed part on the outer shell, a handlebar disposed on top of the outer shell, and a braking system controlled by a twist lock on the handlebar to activate a plurality of brakes on the wheels.

According to another embodiment of the present disclosure, a service cart comprises an outer shell with rounded edges, an inner shell surrounded by the outer shell, a plurality of wheels coupled to the outer shell, a door having smoothly curved corner coupled to the outer shell, a rubber latch connected to the door and capable of magnetically coupling with the outer shell, a handlebar disposed on top of the outer shell having a twist lock, and a locking mechanism located on top of the outer shell under the handlebar to secure the door.

Additional features of the present disclosure will become apparent to those having skill in the art upon consideration of the following detailed description of the illustrative embodiment exemplifying the best mode of carrying out the disclosure as presently perceived.

BRIEF DESCRIPTION OF THE DRAWINGS

The aforementioned aspects and many of the intended features of this invention will grow to be appreciated at a greater level once references to the following accompanying illustrations are expounded upon.

Figure 1:
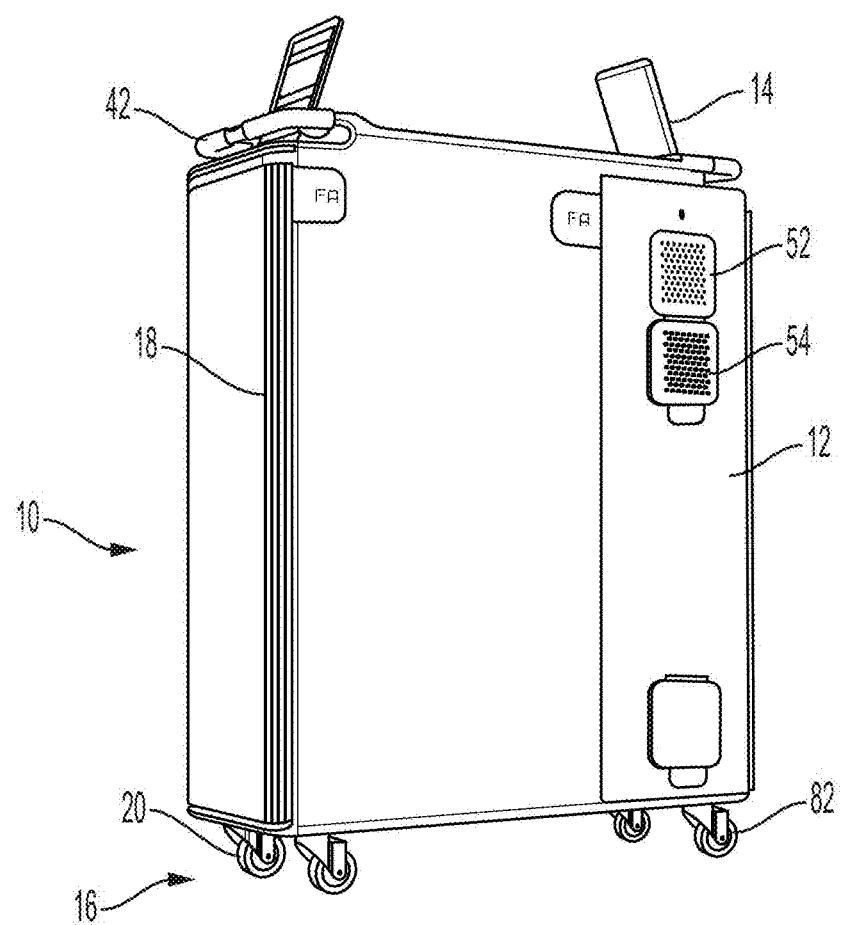
FIG. 1 is a perspective view of a food and beverage cart of the present disclosure, and the cart includes a cart body having at least one vent concealed by a vent cover and having at least one vent open and exposed, control panels, a braking system, wheels, and doors.

Equivalent reference components point to corresponding parts throughout the several views. Unless otherwise indicated, the components shown in the drawings are proportional to each other. Wherein, the illustrations depicted are manifestations of the disclosure, and such illustrations shall in no way be interpreted as limiting the scope of the disclosure. For the purposes of promoting and understanding of the principles of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

DETAILED DESCRIPTION OF THE DRAWINGS

As shown in FIG. 1, a food and beverage cart 10 is designed for use in various public spaces or on public transportation and is configured to facilitate storage and delivery of items contained within cart 10. More particularly, and as disclosed further herein, cart 10 weighs less, has improved packaging, and is configured for "smart" (e.g., electronics) control compared to existing carts already known. Cart 10 comprises a cart body 12 having generally smooth surfaces and rounded portions. For example, the cart body 12 comprises multiple corners or edges which are rounded and, therefore, do not include any right angles or other intersections of linear walls. As such, these rounded corners or edges help to reduce the risk of contacting and hurting passengers and flight attendants when accidents, such as unexpected turbulence, occurs.

Figure 17:
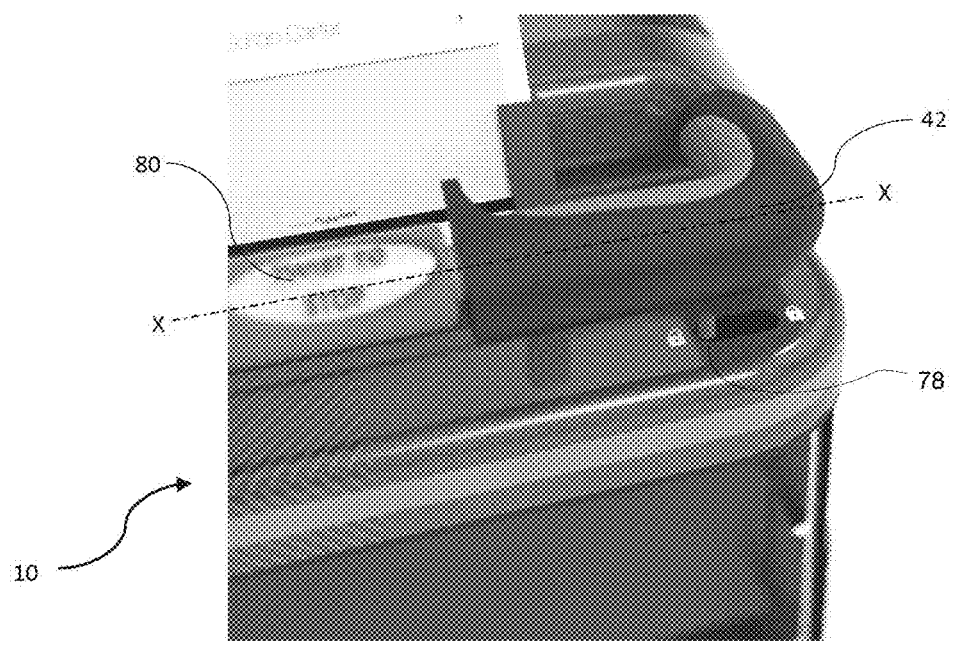
FIG. 17 is a further detailed perspective view of the upper portion and a braking system of the cart of FIG. 16.
Figure 19:
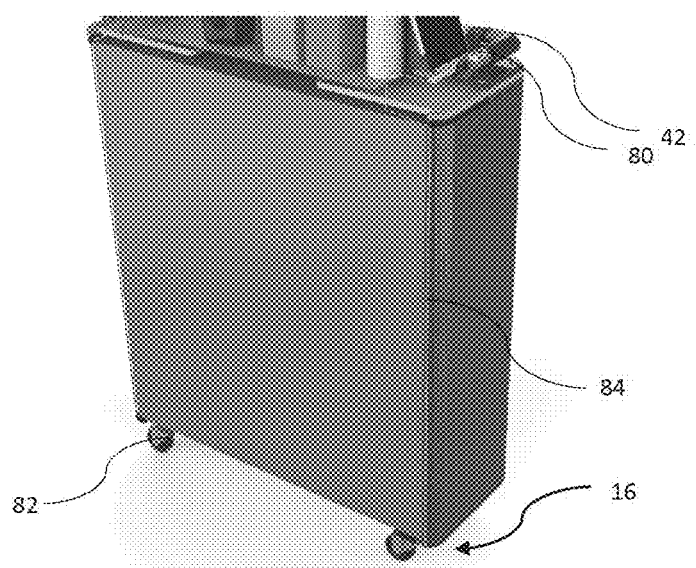
FIG. 19 is a top perspective view of the cart body of FIG. 1, showing a brake cable of the braking system of FIG. 17.

A control device 14 is located on a top of the food and beverage cart 10. At each end of the cart 10 is a handlebar 42 that facilitates pushing and steering the cart. The handlebar 42 comprises a twist lock 80 (FIG. 17) that controls a braking system 16 at wheels 20 to activate brakes 82. The twist lock 80 pulls on a brake cable 84 (FIG. 19) attached to the brakes 82. The cable 84 is connected to the twist lock 80 that is actioned by the attendants. As shown in FIG. 19, the cable 84 of the twist lock 80 runs through the inside of the handlebar 42 and through the door hinge 64, down reaching the brakes 82 on the wheels 20.

Figure 20:
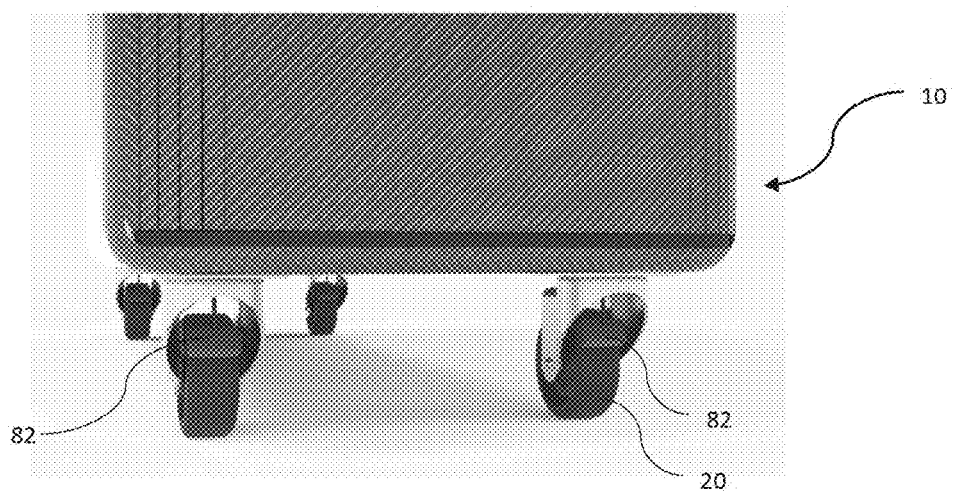
FIG. 20 is an elevational view of the wheels and brakes of the cart of FIG. 1.

When the twist lock 80 is rotated about axis X-X downward by a predetermined amount and/or to a predetermined angle by the flight attendants, the brake 82 on wheel 20 is locked so that the cart 10 cannot move. The attendants may stop the cart 10 by hand at a particular location and then actuate braking system 16 through manual manipulation of twist lock 80. When the attendants want to move the cart 10, they may rotate the lock 80 upward to its original position so that the cart 10 is free to move again. The twist lock 80 in the handlebar 42 allows attendants to stop the cart 10 by hand instead of by foot, so that the attendants do not need to find the lock on the wheel every time when they want to stop the cart 10. As shown in FIG. 20, the brakes 82 are activated when the braking system 16 is triggered by the twist lock 80. The brakes 82 jointly clamp down on the wheels 20 and bring the food and beverage cart 10 to a stop.

Door 18 is located on both sides of the cart 10. The cart 10 comprises vents 52 covered by vent cover 54. The inside of the cart 10 is cooled through the vents 52 when the vents 52 are open. When the vent cover 54 is closed, the cart 10 is sealed to maintain the temperature inside. The vents 52 may be integrated within the walls of cart body 12 and are shown as portions of the walls containing a plurality of openings to allow for ambient air flow into cart body 12.

Cart 10 may be comprised of a light-weight material to reduce the overall weight of cart 10, thereby making cart 10 easier to maneuver and also decreasing its weight contribution on public transportation (e.g., airplanes). In one embodiment, at least portions of cart 10 (including body 12) may be constructed of carbon fiber composites. For example, these composites require a reinforcement material (s) within a matrix (e.g., carbon fiber reinforcement material within a matrix). The reinforcement is, but not limited to, 3k 2×2 twill weave carbon fiber. The fibers with this material and the overall material composition provide a high strength-to-weight ratio, ease of molding, high impact strength and low ductility when cured. The matrix could be an epoxy resin matrix which provides cohesion and strength to the finished product. The advantages of the epoxy resin comprise, for example, moisture resistance, chemical resistance, mechanical and fatigue strength, weight reduction, and impact resistance. According to an embodiment, the mechanical/physical properties of a carbon fiber composition are as follows: Warp: 12-14, 3K; Filling: 12-14, 3K; Tensile Strength: 510-635 KSI; Tensile Modulus: 33.6-34.9 MSI; Weave 2×2 Twill (pattern); Thickness: 0.012" (per layer); Color: Black; Fabric Weight 5.7 oz/sq yd; Resin content: 37% +/−3%; and Cure temperature: 270-310 F.

In embodiments, cart 10 may weigh approximately 3-10 kilograms, and more particularly approximately 6 kilograms, which is around 17 kilograms (65%) lighter than the prior art food and beverage carts currently in service. Planes operating long-haul flights (longer than 8 hours) can carry 40 to 80 carts per plane. If the average long-haul flight takes 8 hours, the fuel burn rate is approximately ⅓ kilogram of fuel burnt per kilogram of payload. Since weight difference between the cart with current design and the conventional carts used on aircraft is approximately 50 lbs per cart, a single airline operating long-haul flights may reduce their fuel amounts by 1000-1500 lbs per flight. This is the equivalent of saving $800 per flight in fuel costs, or $620 million in fuel costs annually. The fuel reduction can also reduce $CO_2$ emissions by one airline by around 15.9 million metric tons per year.

Figure 2:
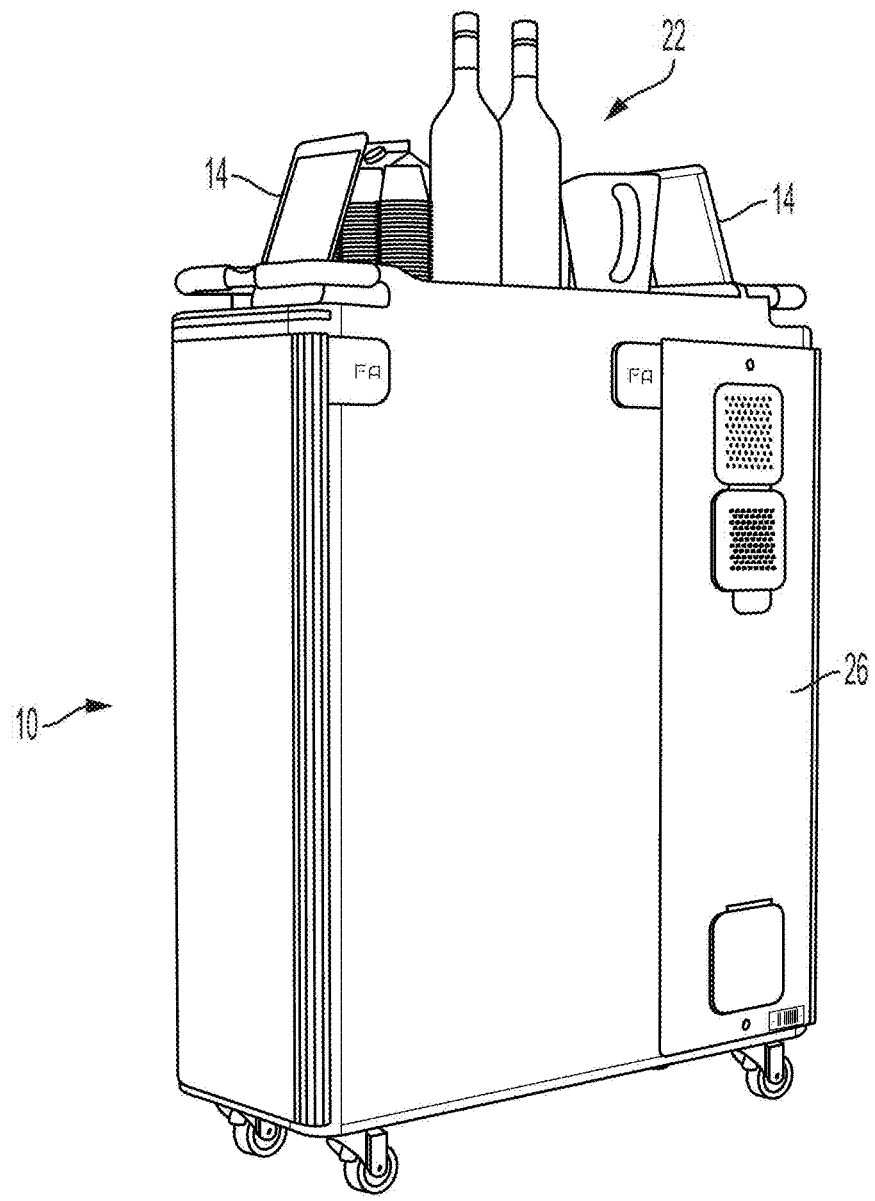
FIG. 2 is a first side view of the cart of FIG. 1, with an example of consumables on the cart.

As shown in FIG. 2, consumables 22, such as food and beverages, are placed on the cart 10, between two control devices 14 positioned on an upper or top surface of cart 10. The consumables 22 placed on the cart 10 give attendants easy access to them.

Figure 3:
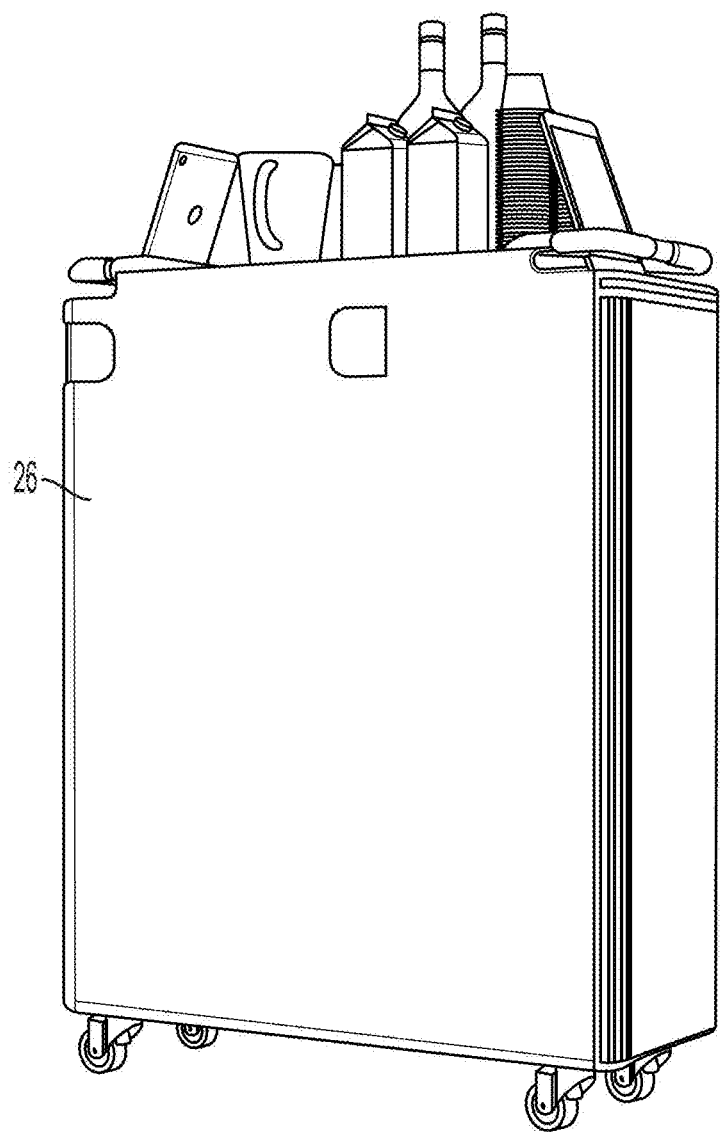
FIG. 3 is a second side view of the cart of FIG. 2.

FIG. 3 illustrates the cart 10 of FIG. 1 from a second side. While vents 52 are not shown on this side of cart body 12, it is possible for various embodiments of cart 10 to include vents 52 on the side shown in FIG. 3.

Figure 4:
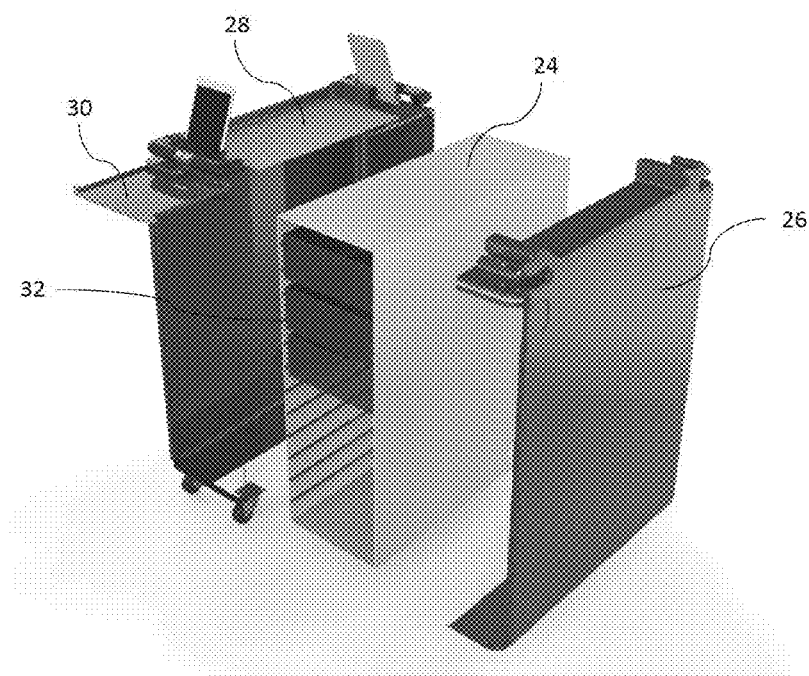
FIG. 4 is an exploded view of the cart of FIG. 1.

As shown in FIG. 4, the cart body 12 of food and beverage cart 10 comprises an inner shell 24, an outer shell 26, an upper shelf 28 (defined as a recessed area or storage platform), and a tray 30. In one embodiment, the inner shell 24 is made of carbon fiber composite and designed to hold compartments 32. Carbon fiber is a very good thermal insulator, so inner shell 24, made from carbon fiber, can maintain the temperature inside the cart 10. In addition, because carbon fiber can sustain rapid temperature changes from high to cold temperatures, the inner shell 24 can contain the temperature inside the cart 10 without compromising cold or warm food. For example, a carbon fiber can have operating temperatures ranging from −99° F. to 450° F. A thin film of aluminum may be added to the inner shell 24 to provide extra retention of cold temperatures such as for cans and drinks. Once the inside of the cart 10 is cooled through the vents 52, the good thermal conductivity of the inside walls with aluminum sheet will maintain the temperature inside the cart 10. For instance, the aluminum film may be 6061 aluminum and the thickness of the aluminum film/sheet can be approximately 0.1 mm to 3.0 mm and, more particularly, may be approximately one mm. The inner shell 24 and compartments 32 allow the consumables 22 to be stored in the cart 10. The outer shell 26 accommodates the inner shell 24. The outer shell 26 is made of a single piece of carbon fiber board so that there are no screws or other heavy frames used to assemble the outer shell 26. The upper shelf 28, where the consumables 22 can be placed, may be made of plastic materials, for example polypropylene. The tray 30 is located above the inner shell 24 and under the handlebar 42. The tray 30 can extend from both ends of the cart 10, so that the attendants may place meals, beverages, or other items on it.

Figure 5:
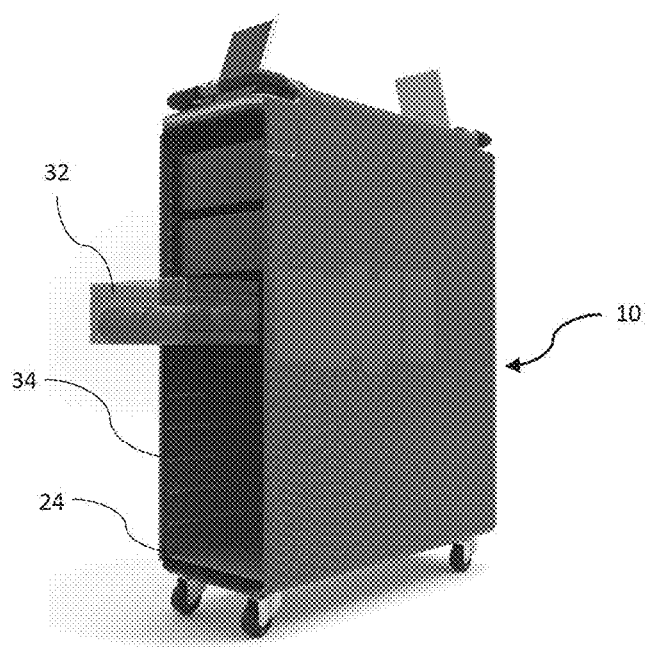
FIG. 5 is a perspective view of the cart of FIG. 1 with a drawer or compartment shown in the open position.
Figure 6:
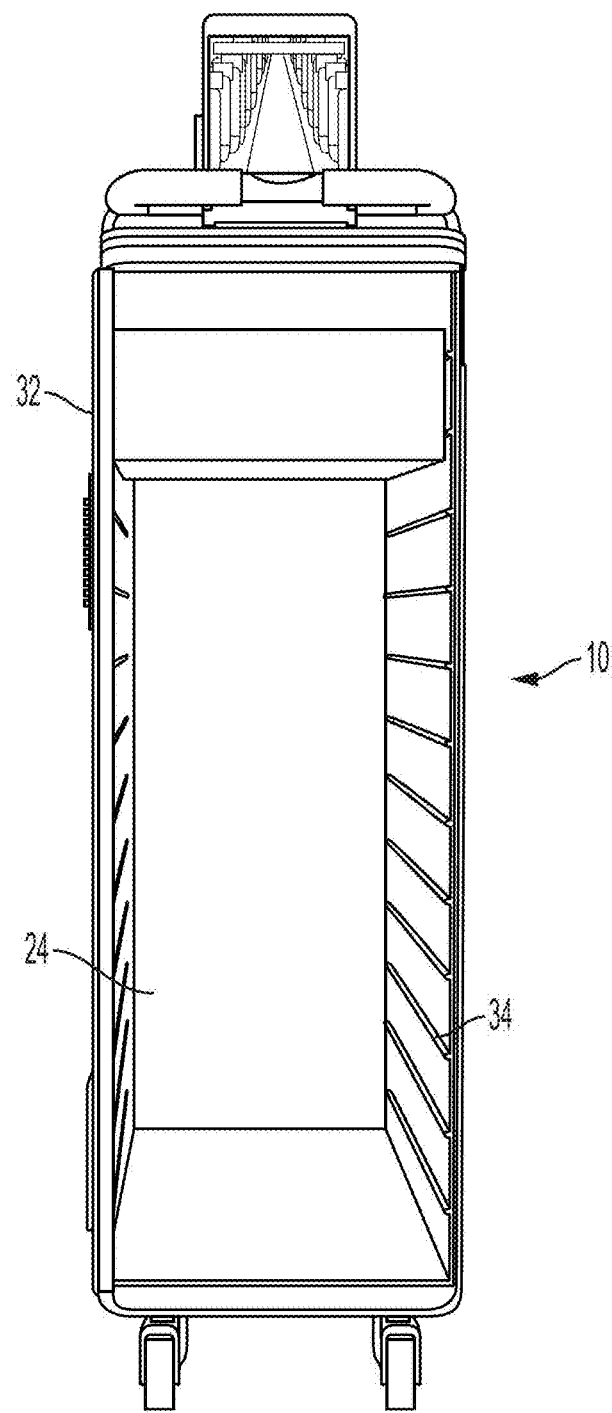
FIG. 6 is an elevational view of the cart of FIG. 1 and showing an interior of the cart.

As shown in FIGS. 5 and 6, the inner shell 24 comprises grooves or rungs 34 running horizontally along the inside of the inner shell 24. The grooves 34 retain and stabilize the compartments 32 and prevent the compartments 32 from shifting and movement. The grooves 34 also allow compartments 32 to slide such that compartments 32 may be pulled out or pushed in relative to cart body 12 for access to consumables 22. The cart 10 opens from both ends, so that the compartments 32 can be loaded from either end. The attendants can access stored meals easily and conveniently. For example, six compartments 32 are retained in the inner shell 24 from one end of the food and beverage cart 10.

Figure 7:
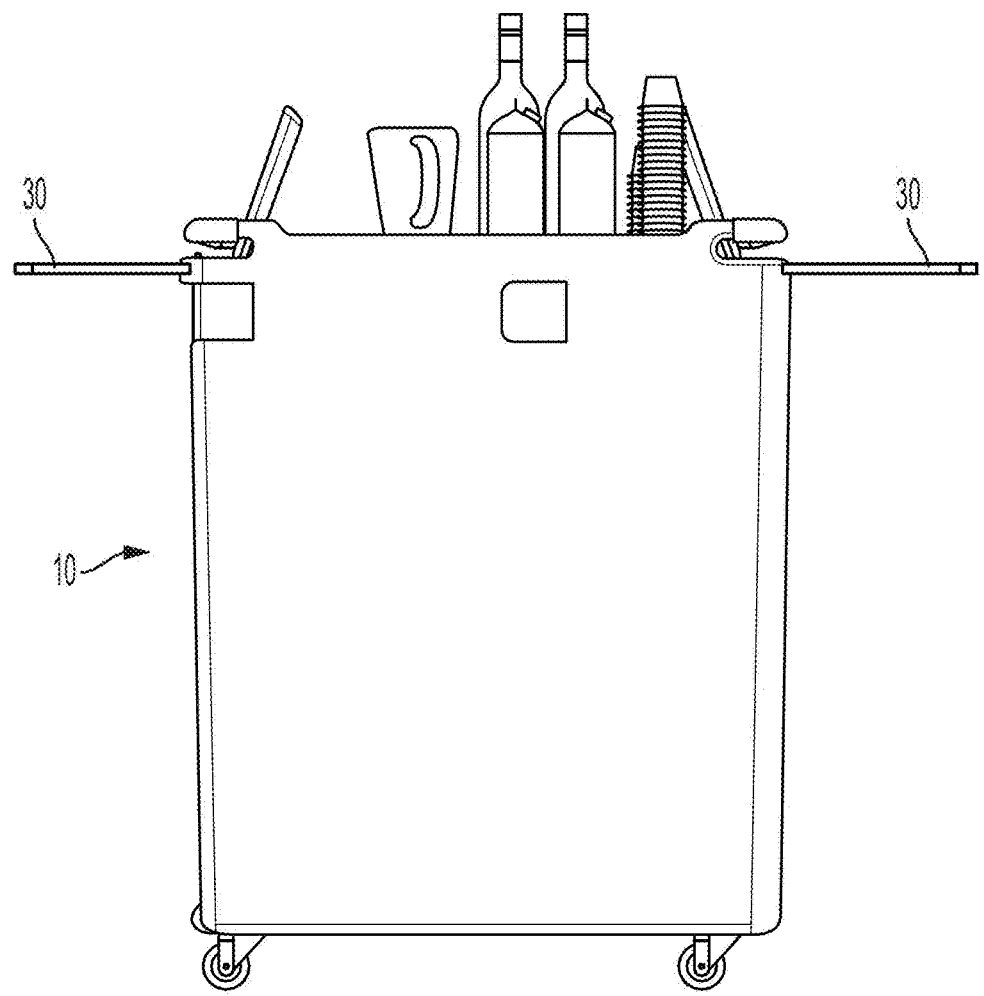
FIG. 7 is a side view of the cart shown with trays or platforms in an extended position.

As shown in FIG. 7, the food and beverage cart 10 comprises trays 30 located at the upper or top part of the food and beverage cart 10. The trays 30 can be pulled out to the extended position shown in FIG. 7. Additionally, trays 30 may be concealed in a closed position, as shown in FIG. 5. As shown in FIG. 7, the trays 30 are located above the inner shell 24 and under the handlebar 42. There is at least one tray 30 on each end of the cart 10 that allows for meals, beverages, or other items to be placed on it. The tray 30 may be made of carbon fiber composites with slick anti-slip surfaces.

Figure 8:
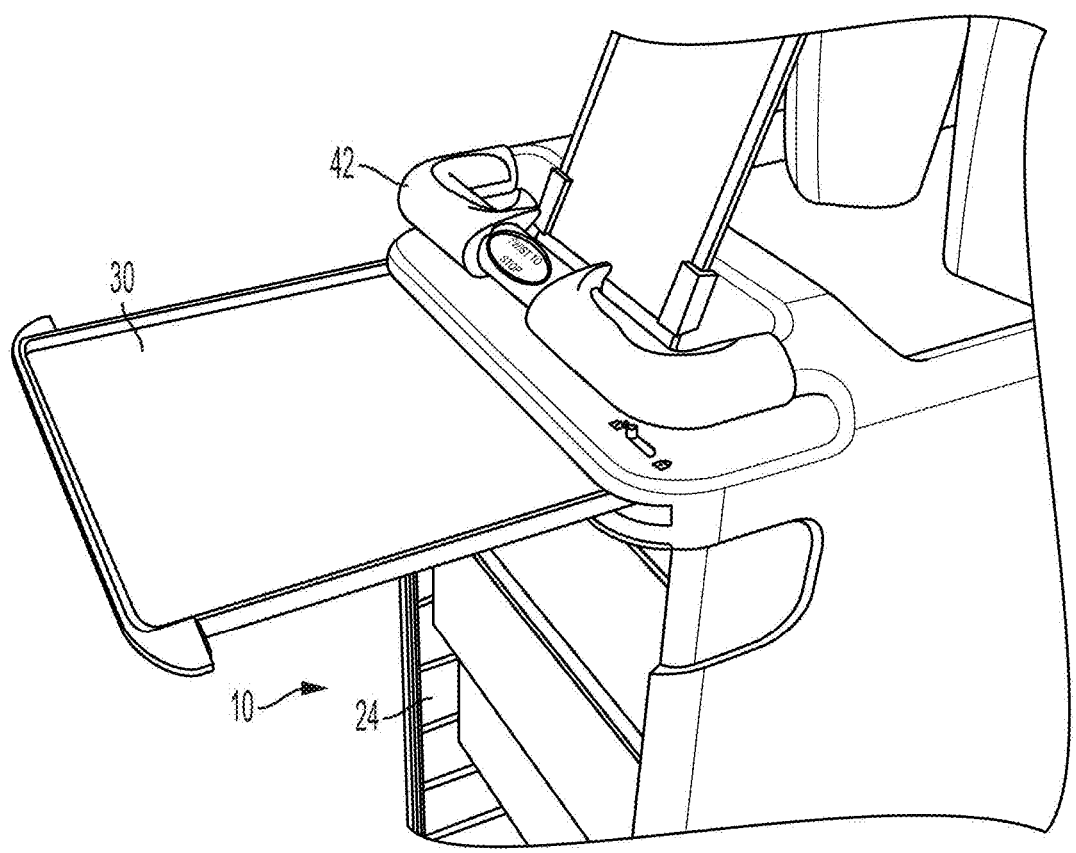
FIG. 8 is a perspective view of the cart of FIG. 7 with one of the trays in the extended position.

As shown in FIG. 8, the tray 30 of FIG. 7 is located at one end of the food and beverage cart 10 in an extended position. The tray 30 can be inserted back into the cart 10 so the outer end of the tray 30 is flush with the end of the food and beverage cart 10, as shown in FIG. 5.

Figure 9:
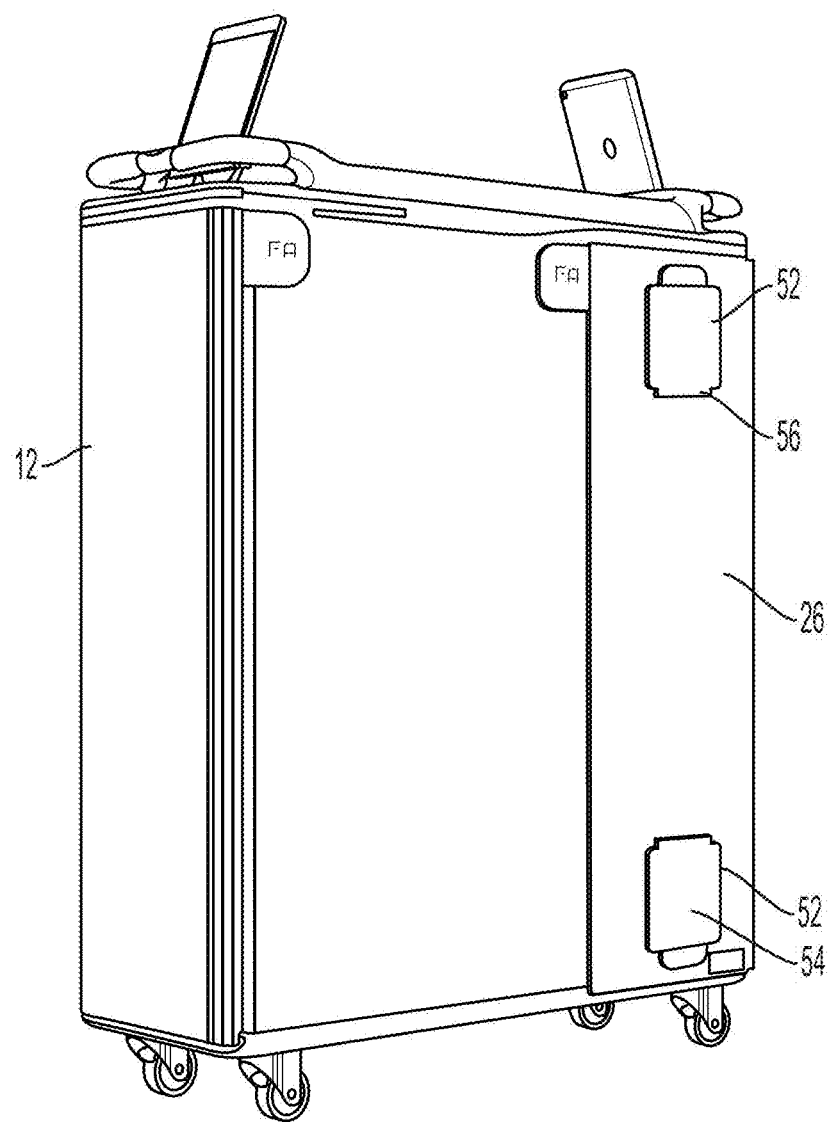
FIG. 9 is a perspective view of the cart of FIG. 1 showing both vents concealed by vent covers.

FIG. 9 shows an example of vents 52, which are located on the outer shell 26 of the cart 10. In this example, both vents 52 are in closed position. The vent 52 is covered by a vent cover 54, which may be made of rubber, such as EPDM rubber. EPDM rubber is very easy to clean and maintain and, if needed, it is inexpensive to replace. EPDM rubber assists in maintaining the temperature inside the cart 10 and improving sealing of the cart 10, thereby preventing dirt from getting inside the cart 10. When the vents 52 are closed, the cart 10 is sealed to maintain the temperature inside. The vent cover 54 is connected to the vent by a hinge 56.

Figure 10:
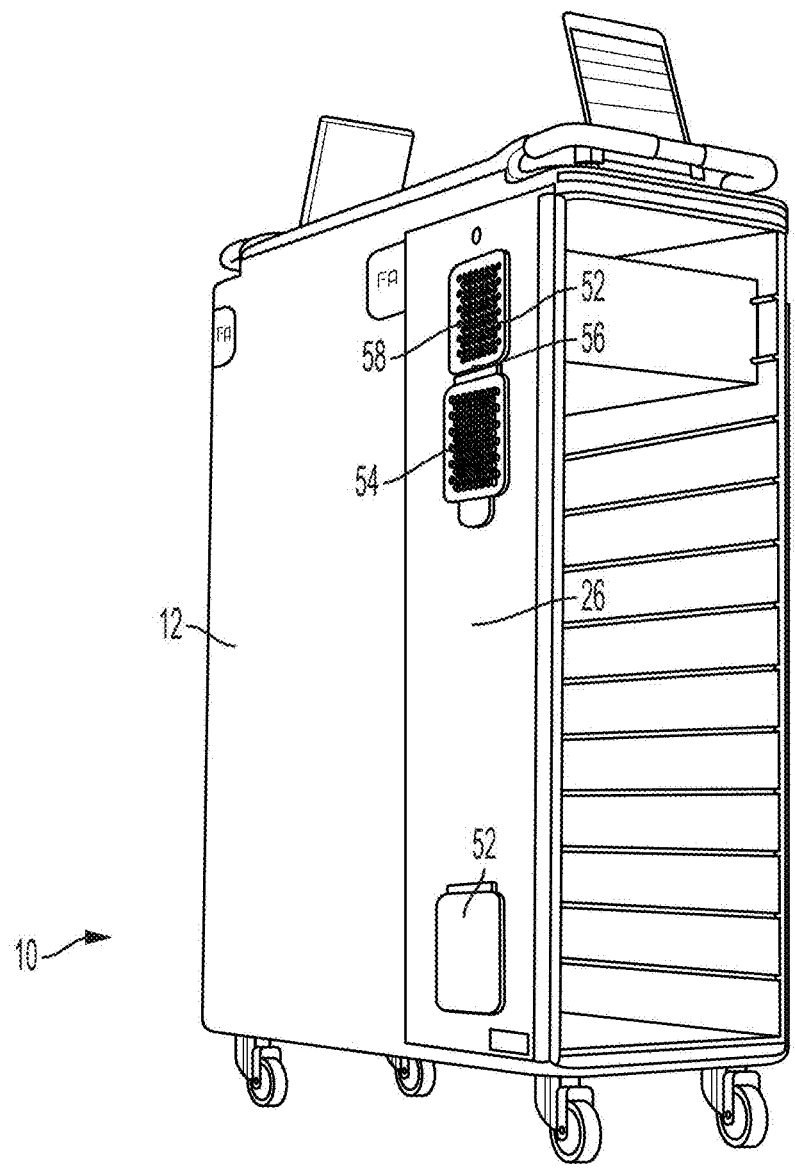
FIG. 10 is a perspective view of the cart of FIG. 1 showing the vents and the interior of the cart, including rungs for supporting various drawers, trays, compartments, etc. within the interior of the cart.

FIG. 10 shows an example of vent 52, which is located on the outer shell 26 of the cart 10. In this example, the upper vent 52 is in an open position, and the lower vent 52 is in a closed position. The vent 52 has regularly arranged holes 58. When the vent 52 is in the open position, the vent cover 54 stays parallel with the outer shell 26 connected by the hinge 56, so that the vent cover 54 does not occupy additional space. The smell inside the cart 10 can come out through the holes 58 when vent 52 is open.

Figure 11:
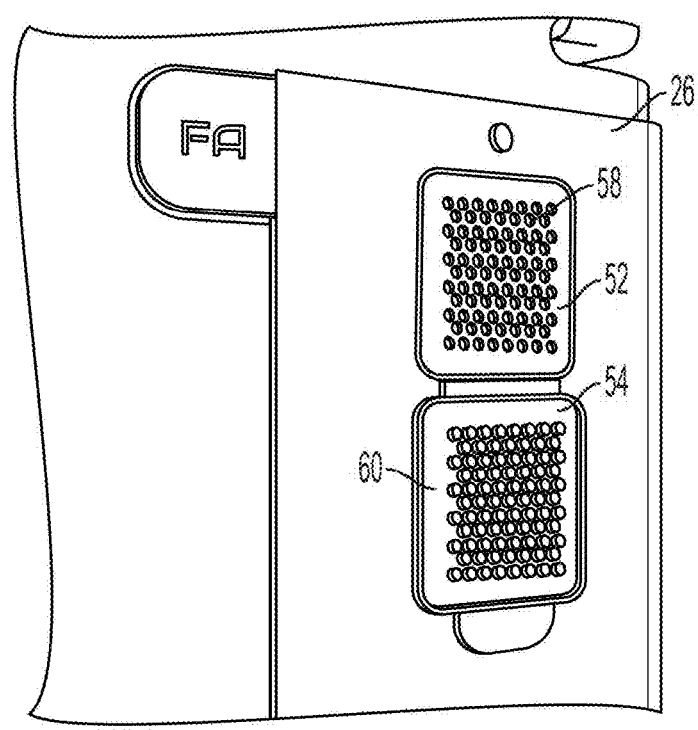
FIG. 11 is a side view of at least one vent of the cart of FIG. 1.

FIG. 11 shows an example of vent 52, which is located on the outer shell 26 of the cart 10. In this example, the vent 52 is in an open position. The vent 52 has regularly arranged holes 58. The vent cover 54 has protrusions 60, which correspond to the holes 58, so that when the vent 52 is in a closed position, the vent cover 54 is tightly attached to the vent 52, and the vent cover 54 does not protrude from the surface of outer shell 26.

Figure 12:
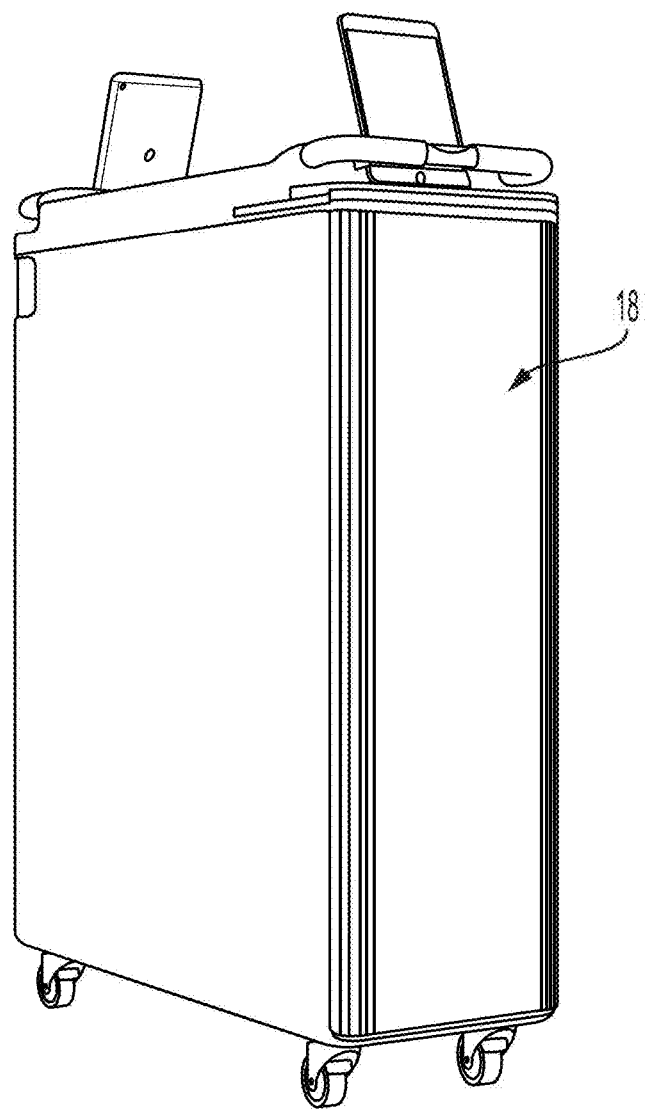
FIG. 12 is a perspective view of the cart of FIG. 1 and having a door shown in a closed position and movably coupled to the cart body.

FIG. 12 shows a door 18 in a closed position. The door 18 is located on both ends of the cart 10. The door 18 is movably (e.g., pivotably) coupled to the cart body 12. When the door 18 is closed, the cart 10 is sealed to maintain the consumables 22 and temperature inside the cart 10. The door 18 may be made of carbon fiber or carbon fiber composite.

Figure 13:
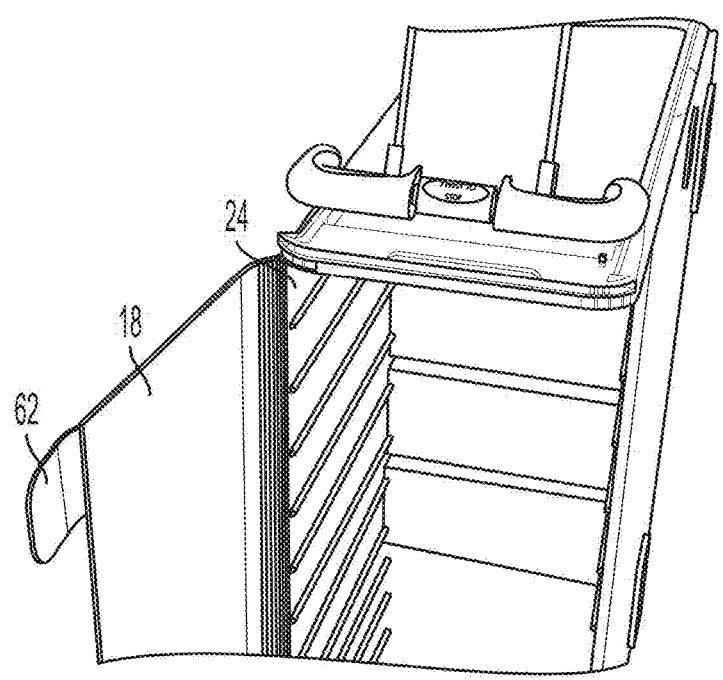
FIG. 13 is a top perspective view of the door of FIG. 12 shown in an open position and showing the interior of the cart of FIG. 1.

FIG. 13 shows the door 18 in FIG. 12 in an open position. When the door 18 is open, attendants can load and unload food to and from the cart 10 conveniently.

Figure 14:
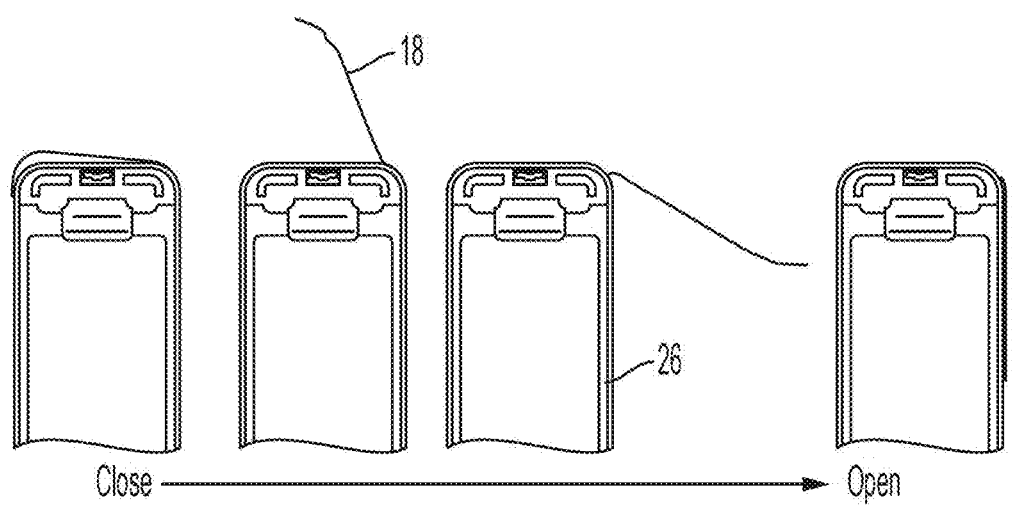
FIG. 14 is a series of steps showing the opening of a door of the cart of FIG. 1.

FIG. 14 shows an opening process of door 18 shown in FIG. 12. In the left most figure, the door 18 is slightly open. In the right most figure, the door 18 is completely open. When the door 18 is completely open, the door 18 is flush with one side of the cart body 12. In this way, the door 18 does not occupy additional space when cart 10 is in use.

Figure 15A:
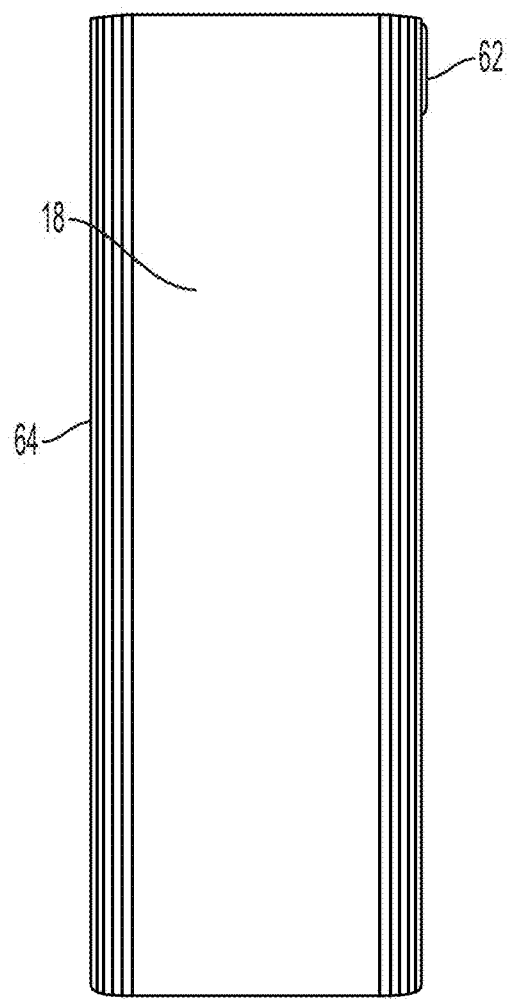
FIG. 15A is an elevational view of the door of FIG. 12.

FIG. 15A is an elevational view of the cart door 18. The body of the door 18 does not bend. The door 18 is coupled to the cart body 12 through door hinge 64, which is part of door 18. The door hinge 64 comprises a curved and continuous portion, for example continuous strips of material (e.g., carbon fiber). The door hinge 64 forms a smoothly curved corner, so that when the door 18 is completely open, the door hinge 64 does not take extra space or stick out of the body, and the door 18 is flush with one side of the cart body 12. Additionally, the door hinge 64 does not include a sharp corner, as disclosed herein. Door hinge 64 may be made of carbon fiber and EPDM rubber. The use of EPDM rubber may allow door hinge 64 to be more flexible, which may ensure a better operation and a longer lifespan. In addition, adding EPDM rubber in manufacturing door hinge 64 may make the door hinge 64 seal more tightly when stowed.

More particularly, the door 18 itself acts as a hinge the continuous portion or continuous strips comprise material with recesses, grooves, or micro-cuts. These recesses in the continuous portion allows the door 18 to adapt to the cart body 12 by wrapping around the corner of cart body 12. In this way, the door 18 is curved on both sides and can remain flat against the cart body 12. It may be appreciated that the middle portion of the door (which is most of its surface area) does not have these recesses, grooves, or micro-cuts but, instead, is a single piece of carbon fiber (one flat panel).

Figure 15B:
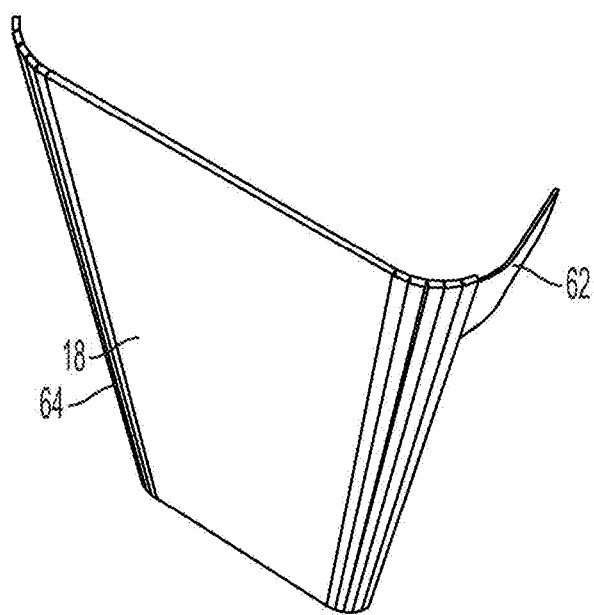
FIG. 15B is a perspective view of the door of FIG. 15A.
Figure 15C:
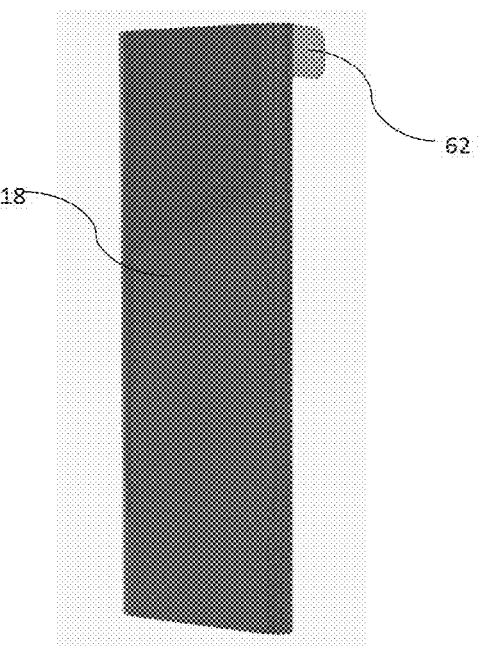
FIG. 15C is a perspective view of the door of FIG. 15B.

Door 18 of FIGS. 15A-15C may have an anti-slip surface. The anti-slip surface of door 18 is designed to allow the machines that are used to clean the carts 10 to hold the door 18 steadily. In addition, because the door 18 may be comprised of carbon fiber, the door 18 may be easy to clean and will not rust compared to a conventional aluminum or steel door. Manufacturing the door 18 from carbon fiber also decreases the weight of door 18 compared to a conventional door made of aluminum or steel.

The right side of the door 18 comprises a door latch 62. The door latch 62 is configured to couple with a recessed area on one side of the outer shell 26 when the door is open, and to couple with another recessed area on the other side of the outer shell 26 when the door 18 is closed. The recessed areas on the outer shell 26 correspond to the position of door latch 62 when door 18 is open or closed. The door latch 62 may be made from rubber, for example, EPDM rubber. Double-sided magnets are incorporated in the end of the door latch 62 and on the side of the cart (e.g., the walls of cart body 12) so that when the door latch 62 is adjacent the walls of cart body 12, they magnetically stick together. One wall of the cart body 12 may include a recessed portion configured to receive the door latch 62 such that latch 62 is flush with the wall when the door 18 is in the closed position (see FIG. 18).

Figure 16:
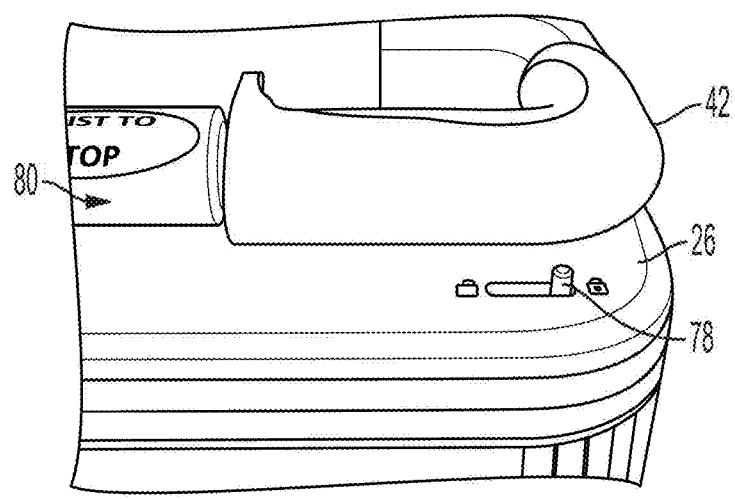
FIG. 16 is a detailed perspective view of an upper portion of the cart of FIG. 1 and showing a locking mechanism of the door.

FIG. 16 shows a locking mechanism 76 for the door 18. The locking mechanism 76 comprises a red pin 78 which is located under the handlebar 42 and on the top of the outer shell 26. The locking mechanism 76 can be operated by one hand. When the red pin 78, shown in FIG. 16, is on the left side, the door 18 can be open or closed. When the red pin 78, shown in FIG. 16, is on the right side, the door 18 is fixed in its position by a brake actuated by the red pin 78. The locking mechanism 76 allows the attendants to lock the movement of the door 18 conveniently.

Figure 18:
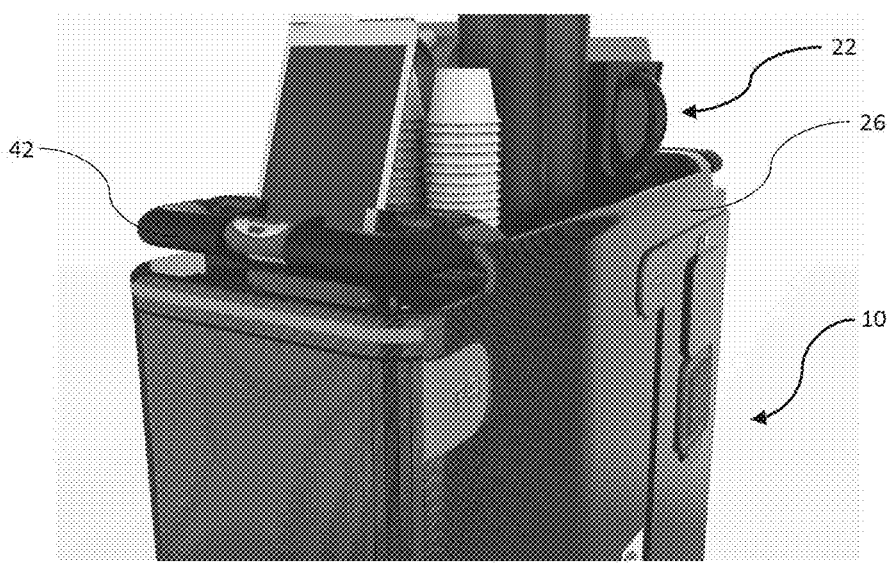
FIG. 18 is a perspective view of the upper portion of the cart of FIG. 1.

As shown in FIG. 18, the consumables 22 can be placed on top of the food and beverage cart 10 on an upper shelf 28. The upper shelf 28 is recessed, so that the risk for consumables 22 falling down from the upper shelf 28 decreases. The upper shelf's 28 anti-slip rubber surface is preferably made from a dry mixture of ferrite powder and rubber polymer resin. The upper shelf 28 also has a bottom layer of magnetic strips giving the surface magnetic qualities. The surface of the upper shelf 28 is anti-slip, which further prevents the consumables 22 from falling. Additionally, the anti-slip surface of the upper shelf 28 prevents consumables 22 from sliding within the upper shelf 28, providing additional safety to the passengers and flight attendants.

Figure 21:
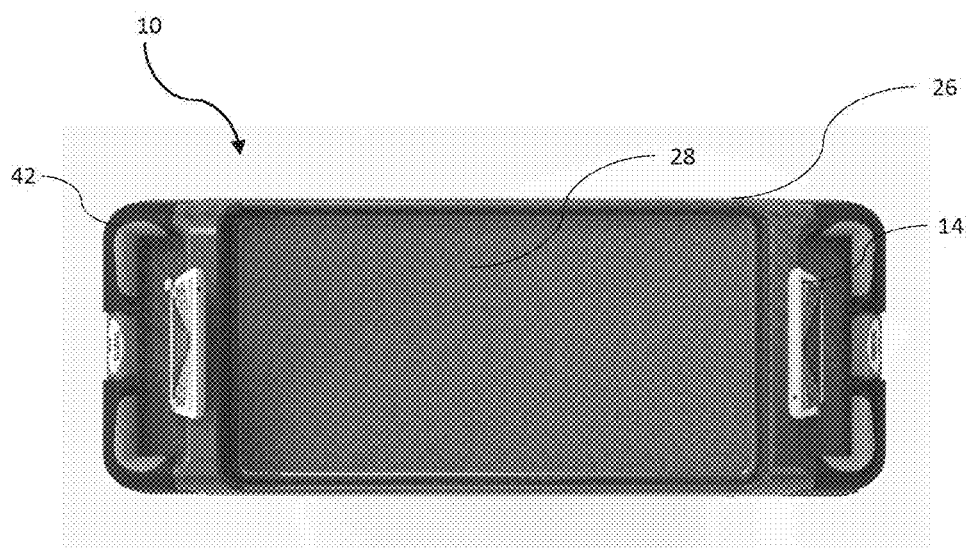
FIG. 21 is a top view of the cart of FIG. 1.

As shown in FIG. 21, the cart 10 according to the present disclosure comprises a control device 14. The control device 14 is positioned between the handlebar 42 and the upper shelf 28. The control devices 14 coordinate the attendants' work. The upper shelf 28 is recessed, so that the consumables 22 are held on the upper shelf. The upper shelf 28 is preferably made of anti-slip material, which helps to prevent spills.

Figure 22:
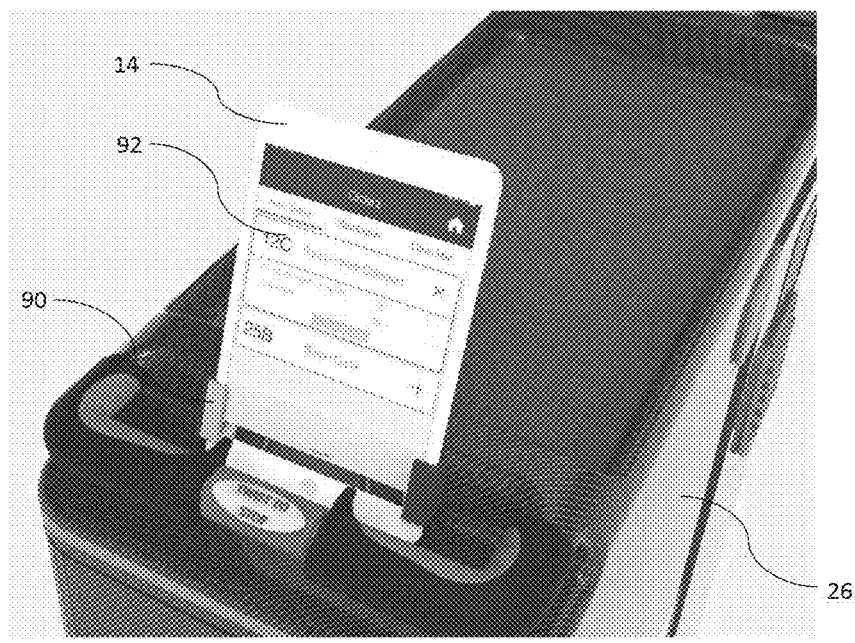
FIG. 22 is a perspective view of a support feature of the cart of FIG. 1 for supporting and securing a control device.
Figure 23:
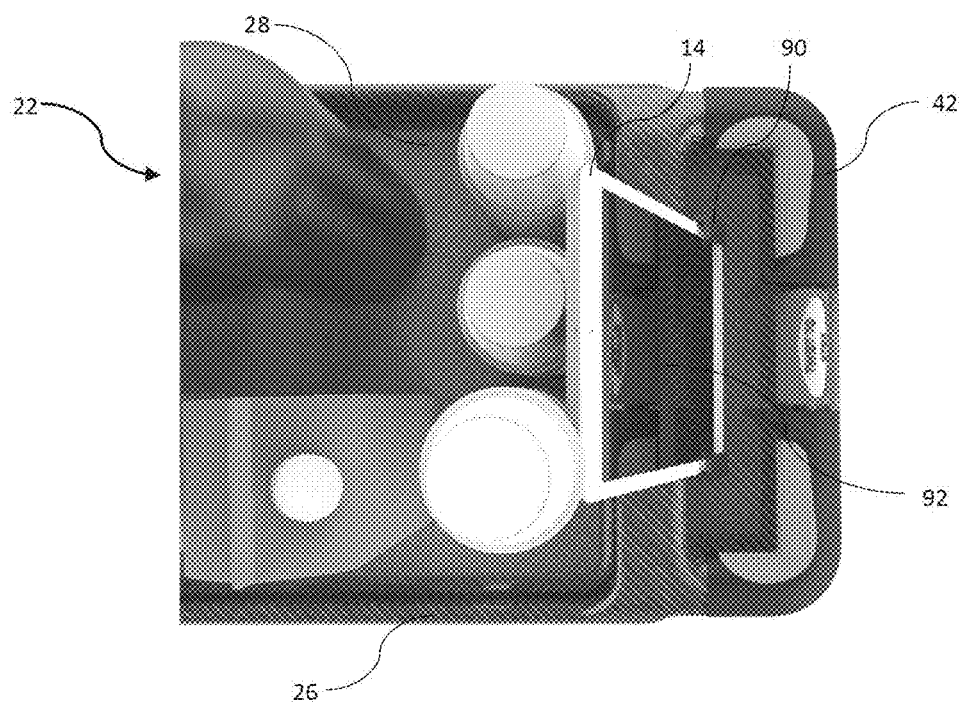
FIG. 23 is a top view of the upper portion of the cart of FIG. 1, including the support feature for the control device.

As shown in FIG. 22, support features 90 are fixed to the outer shell 26. The support features 90 hold the control device 14. Support features 90 may be made of carbon fiber composites following the overall design of the cart 10. The control device 14 comprises a touch screen 92. The touch screen 92 shown in FIG. 22 is one example of such device and different kinds of digital panels are available. The control device 14 is connected to the aircraft cabin via Wi-Fi, thereby enabling flight attendants to digitally process meal orders selected by passengers with their electronic devices, optimizing the catering process by creating a timeslot and optimizing the order of the meals and drinks so that attendants can serve from one end to the other end of the cabin more conveniently. The control device 14 can obtain quantitative data about passenger preferences and food inventories, which helps airlines better know what consumables 22 need to be stocked. This ability to better understand the needed and available consumables 22 may allow airlines to decrease the amount of food need on flights, thereby saving weight and fuel for the aircraft. The control device 14 can incorporate a credit system and a mileage system, allowing passengers to charge various items to personal accounts and/or to change a future flight during the current flight.

Figure 24:
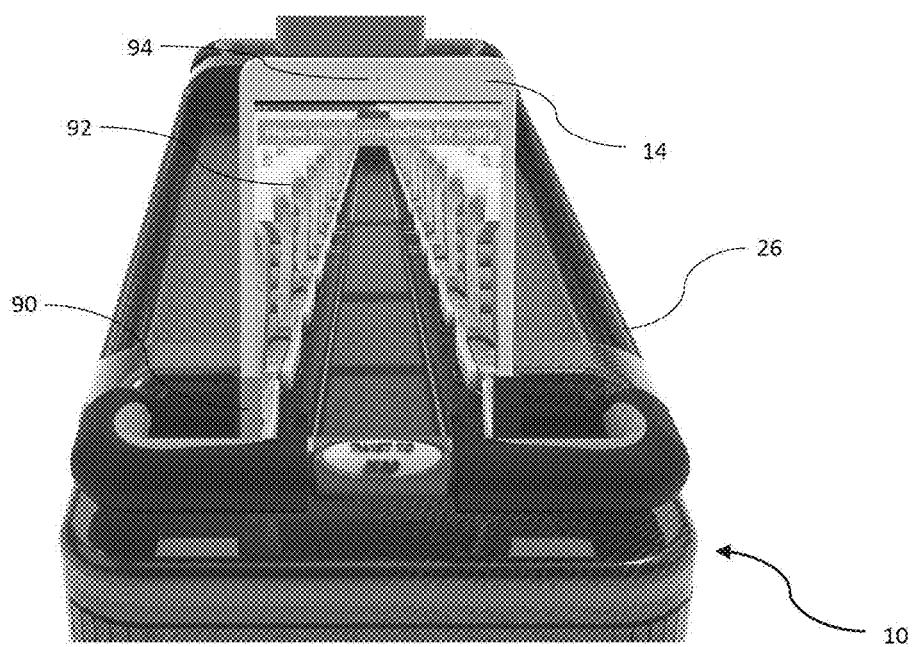
FIG. 24 a top perspective view of the control device on the cart of FIG. 1.

As shown in FIG. 24, the control device 14 is held in the support features 90 attached to the outer shell 26. The interactive touchscreen 92, or another suitable interface, may integrate digital cameras 94 and proximity technology devices (e.g., proximity sensors) displaying an image of the environment ahead of the cart 10, which enables flight attendants to avoid collisions with passengers during the catering process and facilitates a safe environment around the cabin. The location and number of digital cameras 94 and/or other proximity devices and proximity technology as shown are merely exemplary. For example, the digital cameras 94 and proximity devices may be located elsewhere on the control device 14, elsewhere on the food and beverage cart 10, or elsewhere throughout the cabin. The digital cameras 94 and proximity devices may also be connected to the cabin via Wi-Fi to further enable the flight attendants to benefit from the images produced by the digital cameras 94 and proximity technology.

Manufacturing the service cart with carbon fiber composite greatly reduces the weight of the cart, and further reduces the fuel consumption and $CO_2$ emission, which brings economic benefit to airline companies, and also makes the cart more environmentally friendly. Additionally, unlike conventional materials used to manufacture service carts, carbon fiber composite does not rust and is very easy to clean; therefore, service carts manufactured with carbon fiber composite will result in a more hygienic environment around the cabin.

Other benefits of the present invention include operating the braking system by hand instead of by foot, improving convenience. In addition, the design of the new door allows the door to take less space when it is completely open than the old design, which saves the aisle space in order to let passengers walk by. Further, the locking mechanism allows the attendants to lock the movement of the door easily, so that the door will not move freely when loading or unloading items to or from the cart. Moreover, the upper shelf has non-slippery surface so that the consumables placed on it will not slip and fall down from the upper shelf. The cart of the present invention also employs a smart operating system to process the passengers' meal orders and flight changes, which allows attendants to do their job more efficiently. The smart operating system may also display the image of the aisle ahead of the cart on a screen, so that the attendants can operate the cart without hurting people.

Figure 25:
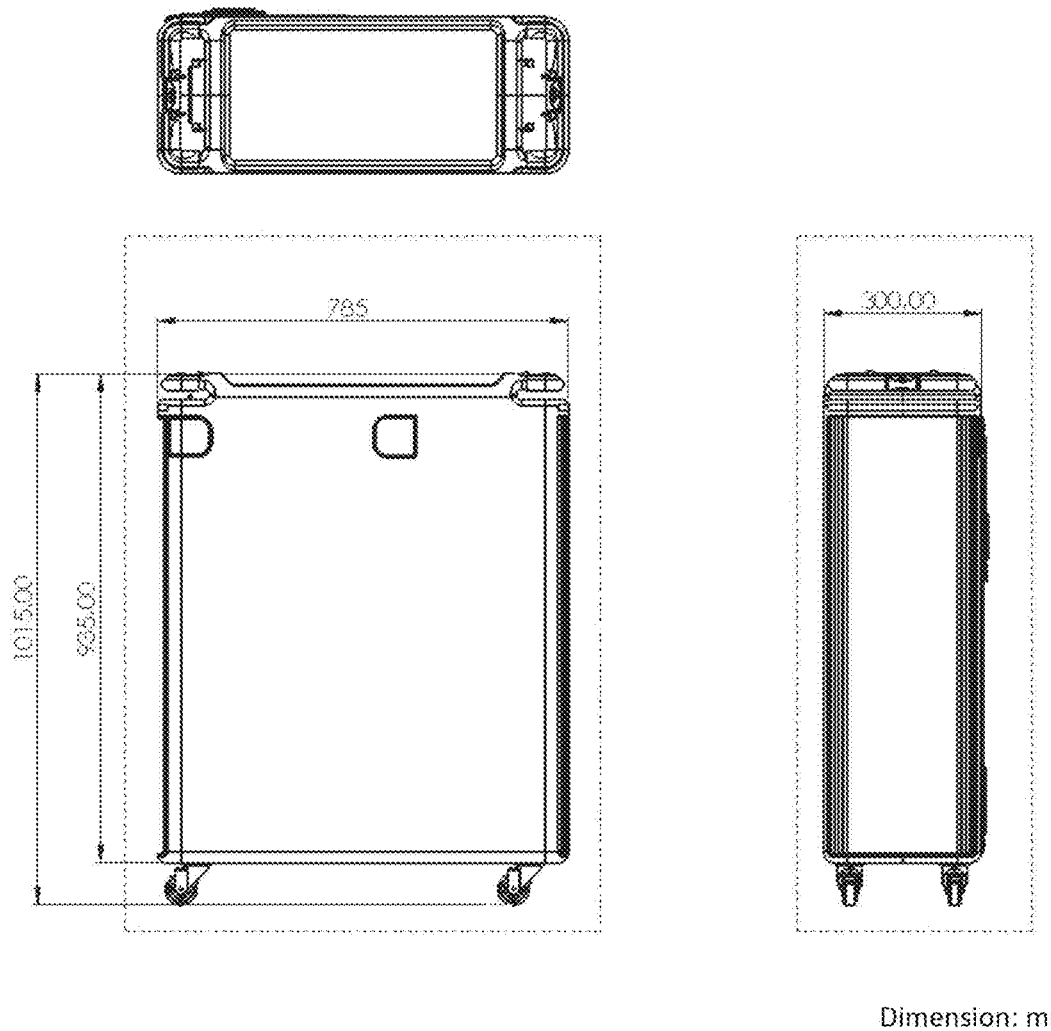
FIG. 25 is a three-view drawing of the cart of FIG. 1, showing dimensions of the cart.

As shown in FIG. 25, according to one embodiment of the present disclosure, the width of the cart 10 may be 300 mm; the length of the cart 10 may be 785 mm; the height of the cart 10 may be 1015 mm (including wheels); and the height of the cart body 12 may be 935 mm.

What is claimed is:

1. A service cart, comprising:
    an outer shell with rounded edges and a recessed area;
    an inner shell surrounded by the outer shell;
    a door coupled to the outer shell;
    a rubber latch connected to the door and capable of magnetically coupling with the recessed area on the outer shell;
    a handlebar disposed on top of the outer shell; and
    a braking system controlled by a twist lock on the handlebar to activate a plurality of brakes on wheels.

2. The service cart of claim 1, wherein the outer shell is made by a single sheet of carbon fiber composite material.

3. The service cart of claim 1, wherein the inner shell comprises a plurality of grooves horizontally located along the inside of the inner compartment.

4. The service cart of claim 1, further comprising a tray coupled to both ends of the outer shell below the handlebar.

5. The service cart of claim 4, wherein the tray is made of carbon fiber composites with slick anti-slip surfaces.

6. The service cart of claim 4, wherein the tray can be inserted into or extended from the service cart.

7. The service cart of claim 1, further comprising vent with regularly arranged holes.

8. The service cart of claim 7, wherein the vent can be concealed by a vent cover connected to the vent by a hinge.

9. The service cart of claim 8, wherein the vent cover has protrusions corresponding to the holes.

10. The service cart of claim 1, further comprising a locking mechanism located under the handlebar and above the outer shell.

11. The service cart of claim 1, wherein the handlebar has a twist lock to trigger the braking system.

12. A service cart, comprising:
- an outer shell with rounded edges;
- an inner shell surrounded by the outer shell;
- a plurality of wheels coupled to the outer shell;
- a door having smoothly curved corner coupled to the outer shell;
- a rubber latch connected to the door and capable of magnetically coupling with the outer shell;
- a handlebar disposed on top of the outer shell having a twist lock; and
- a locking mechanism located on top of the outer shell under the handlebar to secure the door.

13. The service cart of claim 12, further comprising a braking system controlled by a twist lock in the handlebar to activate a plurality of brakes.

14. The service cart of claim 12, wherein the door coupled to the outer shell through a door hinge formed by continuous strips.

15. The service cart of claim 12 further comprising an upper shelf coupled to the outer shell.

16. The service cart of claim 15, wherein the upper shelf is made of heat insulated rubber.

\* \* \* \* \*